(12) United States Patent
Sun (10) Patent No.: US 8,929,289 B2
(45) Date of Patent: Jan. 6, 2015

(54) ACCESS METHOD, SYSTEM AND DEVICE (75) Inventor: Gengmao Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 210 days.

(21) Appl. No.: 13/574,014

(22) PCT Filed: Mar. 23, 2010

(86) PCT No.: PCT/CN2010/071234
§ 371 (c)(1),
(2), (4) Date: Jul. 19, 2012

(87) PCT Pub. No.: WO2010/148677
PCT Pub. Date: Dec. 29, 2010

(65) Prior Publication Data
US 2012/0287864 A1 Nov. 15, 2012

(30) Foreign Application Priority Data

Jan. 20, 2010 (CN) .......................... 2010 1 0000922

(51) Int. Cl.
*H04W 4/00* (2009.01)
*H04B 7/216* (2006.01)
*H04L 12/28* (2006.01)
*H04L 12/54* (2013.01)
*H04L 29/08* (2006.01)

(52) U.S. Cl.
CPC ............ *H04L 12/5692* (2013.01); *H04L 67/14* (2013.01); *H04L 2012/2841* (2013.01)
USPC ............ 370/328; 370/338; 370/352; 370/401

(58) Field of Classification Search
CPC .......... H04L 63/0485; H04L 12/2898; H04W 88/16; H04W 4/16; H04W 12/02
See application file for complete search history.

(56) References Cited

U.S. PATENT DOCUMENTS

2001/0036192 A1* 11/2001 Chiles et al. ................. 370/401
2002/0114336 A1   8/2002 Chow
(Continued)

FOREIGN PATENT DOCUMENTS

CN  1430387 A   7/2003
CN  1812342 A   8/2006
(Continued)

OTHER PUBLICATIONS

International Search Report; Jul. 22, 2010; issued in International Patent Application No. PCT/CN2010/071234.

*Primary Examiner* — Melanie Jagannathan
(74) *Attorney, Agent, or Firm* — Moore & Van Allen PLLC (57) ABSTRACT The present invention provides an access method, system and device. In the solution of the present invention, a CPE sub-system receives a connection request for carrying out a data connection with a WAN, when determining that the CPE sub-system itself is not able to carry out a wired connection with the WAN, sends the connection request to an MID sub-system through a connection interface, so that a wireless connection is carried out with the WAN through the MID sub-system; the MID sub-system receives a connection request for carrying out a data connection with a WAN, when determining that the MID sub-system itself is not able to carry out a wireless connection with the WAN, sends the connection request to the CPE sub-system through the connection interface, so that a wired connection is carried out with the WAN through the CPE sub-system. In accordance with the solution of the present invention, not only the wired access but also the wireless access is able to be realized for the WAN, thereby providing stable network connection for home users and bringing great convenience for the users.

10 Claims, 4 Drawing Sheets

(56) References Cited

U.S. PATENT DOCUMENTS

| | | | |
|---|---|---|---|
| 2004/0001496 A1* | 1/2004 | Yusko et al. | 370/401 |
| 2005/0058143 A1* | 3/2005 | Kikuchi et al. | 370/401 |
| 2005/0107086 A1* | 5/2005 | Tell et al. | 455/445 |
| 2006/0098620 A1* | 5/2006 | Zhou et al. | 370/352 |
| 2009/0204805 A1* | 8/2009 | Robba et al. | 713/153 |

FOREIGN PATENT DOCUMENTS

| | | |
|---|---|---|
| EP | 1962453 A1 | 8/2008 |
| WO | WO2005043399 A2 | 5/2005 |

* cited by examiner

ACCESS METHOD, SYSTEM AND DEVICE

FIELD OF THE INVENTION

The present invention relates to the field of digital home, and in particular to an access method, an access system and an access device.

BACKGROUND OF THE INVENTION

Future family will be a networked and informationized family; the external is connected with a high-speed digital communication line and the internal controls information household appliances with different functions through a home server. Through a home network, many household appliances can be operated and controlled. When people are away from home, they can manipulate many kinds of household appliances in their houses through the communication mode of home network, for example, open an automatic curtain or turn off a micro oven. When working on a computer, a user can observe images transmitted from a digital camera or a camera installed on a door through a small window on the screen of the computer, thereby confirming who the knocker is; if there is any unusual conditions, the user can send out alarm information. In the same way, information also can be transmitted among all kinds of household appliances through the home network. In addition, home office would become a tendency in future, and home would become a more comfortable office environment; people can keep a connection with a computer network of a company using their own laptops at any place anytime, perform data communication anytime and anywhere and use peripheral devices such as printer and projector, needing no cable to keep the communication state.

The implementation and application of all these wonderful prospects are based on a smooth communication between the home network and an external Wide Area Network (WAN). Imaginably, if the communication between the home network and the external WAN is instable, it is very difficult to guarantee the quality of the home office and home online entertainments, thus the user experience is greatly impacted. Most people have suffered an embarrassment when surfing the Internet that the network speed is very slow or the network is not able to be accessed due to a network fault, even suffered a condition that an emergency needing to be dealt with is delayed due to a network fault. The WAN comprises a mobile communication network, the Internet and so on.

The present digital home product accesses the WAN through a single access mode, generally through wireless access or wired access. There are few digital home products simultaneously supporting both the wired access and the wireless access, which brings a great inconvenience or limit to users and is difficult to provide a sufficient guarantee for the stability and speed of the home network communication. Therefore, there exists a strong need of a method and a system for processing home information, which can support both the wired access and the wireless access.

SUMMARY OF THE INVENTION

In view of the problems above, the present invention provides an access method, an access system and an access device, which can support both wired access and wireless access to a WAN, thereby providing a stable network connection for home users.

The technical solution of the present invention is realized as follows.

The present invention provides an access system, comprising: a Customer Premise Equipment (CPE) sub-system, a Mobile Internet Device (MID) sub-system and a connection interface, wherein the connection interface is configured to provide a channel for communication between the CPE sub-system and the MID sub-system;

the CPE sub-system is configured to receive a connection request for carrying out a data connection with a WAN, send, when determining that the CPE sub-system itself is not able to carry out a wired connection with the WAN, the connection request to the MID sub-system through the connection interface so that a wireless connection is carried out with the WAN through the MID sub-system; and the MID sub-system is configured to receive a connection request for carrying out a data connection with the WAN, send, when determining that the MID sub-system itself is not able to carry out a wireless connection with the WAN, the connection request to the CPE sub-system through the connection interface so that a wired connection is carried out with the WAN through the CPE sub-system.

In the solution above, the system further comprises:

a charge interface, configured to implement a charge function for a battery in the MID sub-system by the CPE sub-system.

In the solution above, the CPE sub-system is further configured to carry out a wired connection with the WAN; and the MID sub-system is further configured to carry out a wireless connection with the WAN.

The present invention also provides an access method, comprising:

a CPE sub-system receiving a connection request for carrying out a data connection with a WAN, sending, when determining that the CPE sub-system itself is not able to carry out a wired connection with the WAN, the connection request to an MID sub-system through a connection interface so that a wireless connection is carried out with the WAN through the MID sub-system;

the MID sub-system receiving a connection request for carrying out a data connection with the WAN, sending, when determining that the MID sub-system itself is not able to carry out a wireless connection with the WAN, the connection request to the CPE sub-system through the connection interface so that a wired connection is carried out with the WAN through the CPE sub-system.

In the solution above, the method further comprises:

carrying out a wired connection with the WAN through the CPE sub-system when the CPE sub-system is able to carry out the wired connection with the WAN; and carrying out a wireless connection with the WAN through the MID sub-system when the MID sub-system is able to carry out the wireless connection with the WAN.

In the solution above, the step of the CPE sub-system carrying out the wired connection with the WAN comprises: the CPE sub-system carrying out the wired connection with the WAN connected with the CPE sub-system, through a Point to Point Protocol Over Ethernet (PPPoE) mode;

the step of the MID sub-system carrying out the wireless connection with the WAN comprises: the MID sub-system carrying out the wireless connection with the WAN connected with the MID sub-system, through a Point to Point Protocol (PPP) mode.

In the solution above, the method further comprises: when the CPE sub-system is not able to carry out the wired connection with the WAN and the MID sub-system is not able to carry out the wireless connection with the WAN, prompting that the WAN is not able to be accessed.

The present invention also provides a CPE device, comprising:

a PPPoE access module, configured to carry out a wired broadband access to a WAN in a wired connection mode through a WAN port by a CPE sub-system;

a WAN access mode selection module, configured to receive a connection request for carrying out a data connection with the WAN, and send, when determining that the CPE sub-system is not able to carry out a wired connection with the WAN, the connection request to a Wireless Fidelity Access Point (WiFi AP) module through a Wireless Fidelity (WiFi) interface;

the WiFi AP module, configured to provide wireless coverage carried out in a WiFi mode to enable an MID sub-system having a Wireless Fidelity Client (WiFi Client) module to access the CPE sub-system, and send the connection request to the MID sub-system through the WiFi interface so that a wireless connection is carried out with the WAN through the MID sub-system.

In the solution above, the WiFi AP module is further configured to trigger the PPPoE access module after receiving, from the MID sub-system, a connection request for carrying out a data connection with the WAN.

The present invention also provides an MID device, comprising:

a PPP access module, configured to carry out a wireless access to a WAN through a wireless data card by an MID sub-system;

a WAN access mode selection module, configured to receive a connection request for carrying out a data connection with the WAN, and send, when determining that the MID sub-system is not able to carry out the wireless connection with the WAN, the connection request to a WiFi Client module through a WiFi interface; and the WiFi Client module, configured to realize a wireless communication with a WiFi AP module in a CPE sub-system by taking the MID sub-system as a WiFi client, and send the connection request to the CPE sub-system through the WiFi interface so that a wired connection is carried out with the WAN through the CPE sub-system.

In the solution above, the WiFi Client module is further configured to trigger the PPP access module after receiving, from the CPE sub-system, a connection request for carrying out a data connection with the WAN.

In the access method, access system and access device provided by the present invention, a WAN access mode with mutual standby for a home information processing system is introduced, which supports both the wired access and wireless access to the WAN. Since two different access modes are adopted at the WAN side and it is very unlikely that the two different modes have a failure simultaneously, a stable network connection and certain bandwidth can be provided for a home user at the WAN through the home information processing system and method. Thus, a digital home user has no need to worry about the trouble and embarrassment of no access to a network caused by an instable wireless network or a wired-connection line failure. Moreover, during use, the MID sub-system can be inserted into the CPE sub-system, or can be separated from the CPE sub-system; through this separable and combinable structure, a great convenience is brought to users and the product experience of users is more humanized.

DETAILED DESCRIPTION OF THE EMBODIMENTS

The present invention is described below in further detail through the accompanying drawings and specific embodiments.

Figure 1:
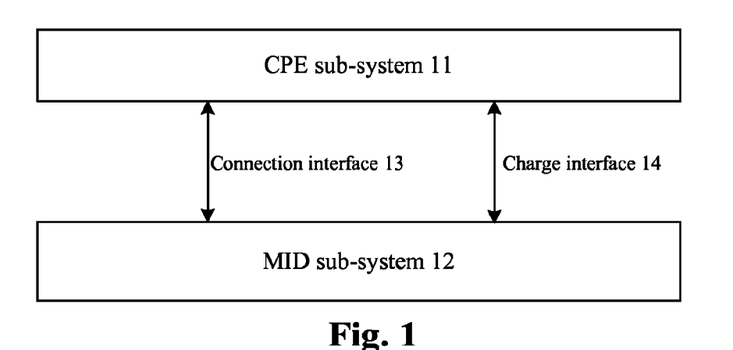
FIG. 1 shows a structure diagram of an access system in accordance with an embodiment of the present invention.

An embodiment of the present invention provides an access system. FIG. 1 shows a structure diagram of the access system in accordance with the embodiment of the present invention. As shown in FIG. 1, the system comprises: a CPE sub-system 11, an MID sub-system 12 and a connection interface 13, wherein the CPE sub-system 11 is configured to receive a connection request for carrying out a data connection with a WAN, and send the connection request to the MID sub-system 12 through the connection interface 13 when determining that the CPE sub-system itself 11 is not able to carry out a wired connection with the WAN, so that a wireless connection is carried out with the WAN through the MID sub-system;

the MID sub-system 12 is configured to receive a connection request for carrying out a data connection with the WAN, and send the connection request to the CPE sub-system 11 through the connection interface 13 when determining that the MID sub-system itself 12 is not able to carry out a wireless connection with the WAN, so that a wired connection is carried out with the WAN through the CPE sub-system;

the connection interface 13 is configured to provide a channel for the communication between the CPE sub-system 11 and the MID sub-system 12; the connection interface 13 can adopt but is not limited to a WiFi interface, also can adopt Bluetooth.

The CPE sub-system 11 is further configured to carry out a wired connection with the WAN, specifically in a mode of PPPoE.

The MID sub-system 12 is further configured to carry out a wireless connection with the WAN, specifically in a mode of PPP.

The system further comprises:

a charge interface 14 configured to implement a charge function for a battery in the MID sub-system 12 by the CPE sub-system 11, wherein the CPE sub-system 11 can charge the battery in the MID sub-system 12 through a power line.

Figure 2:
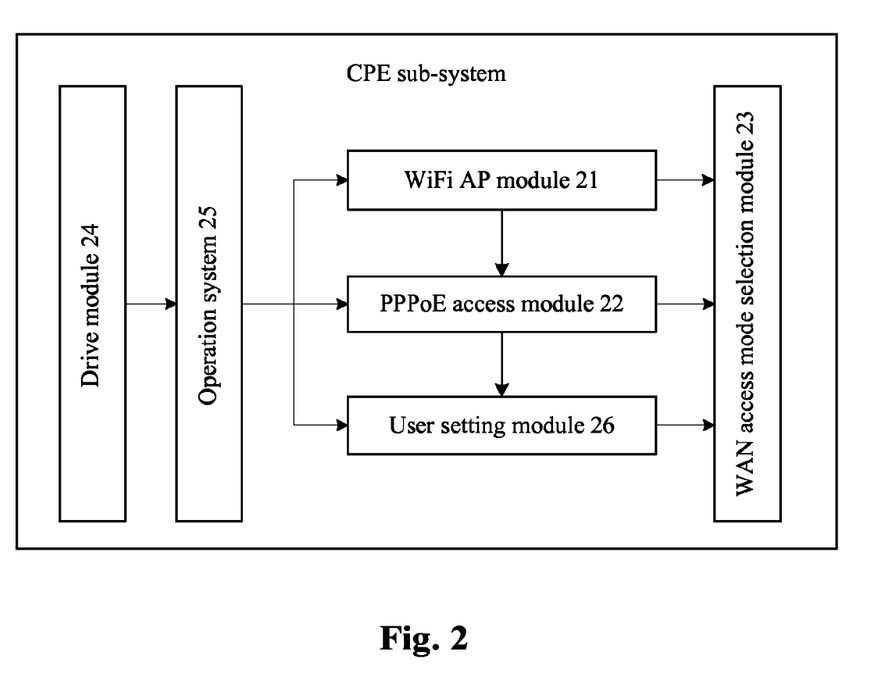
FIG. 2 shows a structure diagram of a CPE sub-system in accordance with an embodiment of the present invention.

FIG. 2 shows a structure diagram of a CPE sub-system in accordance with an embodiment of the present invention. As shown in FIG. 2, when the connection interface between the CPE sub-system and an MID sub-system adopts a WiFi interface, the CPE sub-system comprises: a WiFi AP module 21, a PPPoE access module 22, a WAN access mode selection module 23, wherein the PPPoE access module 22 is configured to carry out a wired broadband access to a WAN in a wired connection mode through a WAN port by the CPE sub-system;

the WAN access mode selection module 23 is configured to receive a connection request for carrying out a data connection with the WAN, and send the connection request to the WiFi AP module 21 through the WiFi interface when determining that the CPE sub-system is not able to carry out a wired connection with the WAN;

the WiFi AP module 21 is configured to provide wireless coverage carried out in a WiFi mode to enable the MID sub-system having a WiFi Client module to access the CPE sub-system, and send the connection request to the MID sub-system through the WiFi interface so that a wireless connection is carried out with the WAN through the MID sub-system.

The WiFi AP module 21 is further configured to trigger the PPPoE access module 22 after receiving, from the MID sub-system, a connection request for carrying out a data connection with the WAN.

The CPE sub-system can further comprise: a drive module 24, an operation system 25 and a user setting module 26, wherein the drive module 24 is configured to provide an interface between a hardware device and the operation system 25, wherein the operation system 25 can only control the operation of the hardware device through an interface function provided by the drive module 24; the interface function comprises a charge enable function, a charge disable function, a WiFi interface enable function, a WiFi interface disable function and the like; the hardware device comprises: a charge interface, a WiFi interface and the like; when the WiFi interface is enabled, the CPE sub-system provides wireless coverage carried out in a WiFi mode; when the WiFi interface is disabled, the CPE sub-system is not able to provide the wireless coverage carried out in a WiFi mode; when the WiFi interface is disabled, other devices having a WiFi Client is not able to be connected with the CPE sub-system through the WiFi AP, because the CPE sub-system has disabled the WiFi interface;

the operation system 25 is configured to control the operation of the entire CPE sub-system and the management of other modules in the CPE sub-system, wherein the operation system of the CPE sub-system generally adopts a Linux operation system;

the user setting module 26 is configured to perform setting through an external Personal Computer (PC), wherein the set contents comprise wireless connection disable setting, wireless connection enable setting, wired connection disable setting, wired connection enable setting, configuration of routing information and so on; in a default condition, the wireless connection of the WAN for the MID sub-system and the wired connection of the WAN for the CPE sub-system are enabled.

Figure 3:
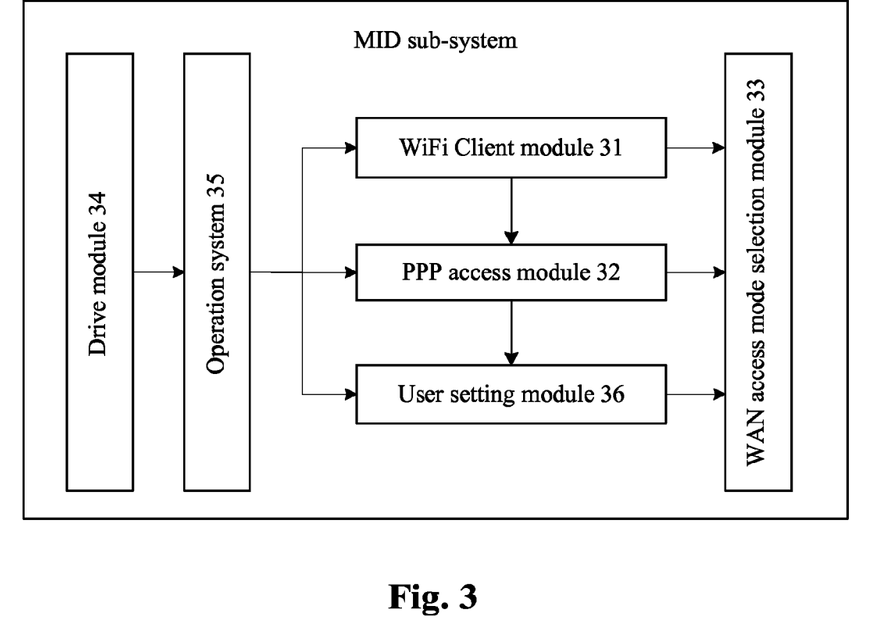
FIG. 3 shows a structure diagram of an MID sub-system in accordance with an embodiment of the present invention.

FIG. 3 shows a structure diagram of an MID sub-system in accordance with an embodiment of the present invention. As shown in FIG. 3, when the connection interface between the CPE sub-system and the MID sub-system adopts a WiFi interface, the MID sub-system comprises: a WiFi Client module 31, a PPP access module 32 and a WAN access mode selection module 33, wherein the PPP access module 32 is configured to carry out a wireless access to a WAN through a wireless data card by the MID sub-system, wherein there can be various modes of the wireless data card, for example, Wideband Code Division Multiple Access (WCDMA), Code Division Multiple Access (CDMA) 2000, Time Division-Synchronization Code Division Multiple Access (TD-SCDMA), Worldwide Interoperability for Microwave Access (WiMAX), Long Term Evolution (LTE) and the like;

the WAN access mode selection module 33 is configured to receive a connection request for carrying out a data connection with the WAN, and send the connection request to the WiFi Client module 31 when determining that the MID sub-system is not able to carry out a wireless connection with the WAN;

the WiFi Client module 31 is configured to realize a wireless communication with a WiFi AP module in the CPE sub-system by taking the MID sub-system as a WiFi client, and send the connection request to the CPE sub-system through the WiFi interface so that a wired connection is carried out with the WAN through the CPE sub-system.

The WiFi Client module 31 is further configured to trigger the PPP access module 32 after receiving, from the CPE sub-system, a connection request for carrying out a data connection with the WAN.

The MID sub-system can further comprise: a drive module 34, an operation system 35 and a user setting module 36, wherein the drive module 34 is configured to provide an interface between a hardware device and the operation system 35, wherein the operation system 35 can only control the operation of the hardware device through an interface function provided by the drive module 34; the interface function comprises a charge enable function, a charge disable function, a WiFi interface enable function, a WiFi interface disable function and the like; the hardware device comprises: a charge interface, a WiFi interface and the like; when the WiFi interface is enabled, the MID sub-system is able to realize a wireless connection with the CPE sub-system in a WiFi mode; when the WiFi interface is disabled, the MID sub-system is not able to realize the wireless connection with the CPE sub-system in a WiFi mode;

the operation system 35 is configured to control the operation of the entire MID sub-system and the management of other modules in the MID sub-system, wherein the operation system of the MID sub-system generally adopts operation systems such as XP and Linux;

the user setting module 36 is configured to perform setting through a User Interface (UI) of the MID sub-system, wherein the set contents comprise wireless connection disable setting, wireless connection enable setting, wired connection disable setting, wired connection enable setting, configuration of routing information and so on; in a default condition, the wireless connection of the WAN for the MID sub-system and the wired connection of the WAN for the CPE sub-system are enabled.

In the method provided by the embodiment of the present invention, the CPE sub-system receives a connection request for carrying out a data connection with a WAN, sends the connection request to the MID sub-system through the connection interface when determining that the CPE sub-system itself is not able to carry out a wired connection with the WAN, so that a wireless connection is carried out with the WAN through the MID sub-system; and the MID sub-system receives a connection request for carrying out a data connection with the WAN, and sends the connection request to the CPE sub-system through the connection interface when determining that the MID sub-system itself is not able to carry out a wireless connection with the WAN, so that a wired connection is carried out with the WAN through the CPE sub-system.

Figure 4:
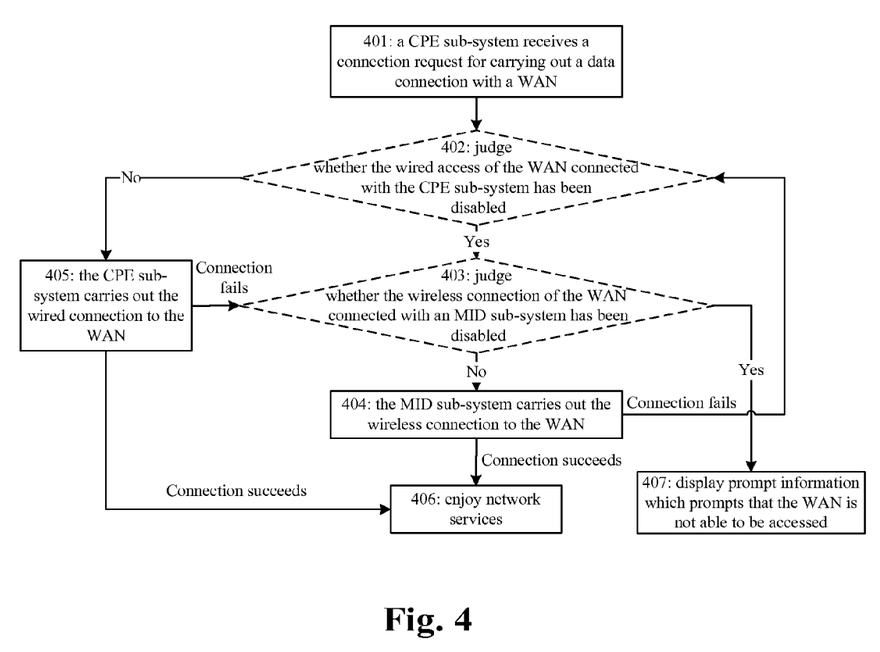
FIG. 4 shows a flowchart of a method for a CPE sub-system accessing a WAN in accordance with an embodiment of the present invention.

FIG. 4 shows a flowchart of a method for a CPE sub-system accessing a WAN in accordance with an embodiment of the present invention. As shown in FIG. 4, the method for the CPE sub-system accessing the WAN in accordance with the embodiment of the present invention comprises the steps as follows.

Step 401: the CPE sub-system receives a connection request for carrying out a data connection with the WAN.

Specifically, the CPE sub-system receives a connection request for carrying out a data connection with the WAN, from a device, connected with the CPE sub-system, requesting access to a network. Since the CPE sub-system can provide wireless coverage carried out in a WiFi mode, only devices with a WiFi Client can be connected to the CPE sub-system; thus, the device, connected with the CPE sub-system, requesting access to a network must have a WiFi Client, wherein the WiFi Client is connected with the CPE sub-system through a WiFi AP. The device, connected with the CPE sub-system, requesting access to a network is, for example, a PC with the WiFi Client or a mobile terminal with the WiFi Client.

Step 402: it is judged whether the wired access of the WAN connected with the CPE sub-system has been disabled; if so, execute Step 403; otherwise, execute Step 405.

Specifically, the CPE sub-system judges whether the wired access of the WAN connected with the CPE sub-system itself has been disabled; if so, execute Step 403; otherwise, execute Step 405, wherein the basis for the CPE sub-system judging whether the wired access of the WAN connected with the CPE sub-system itself has been disabled is: a parameter stored in a memory when a user sets whether to disable the wired access of the WAN connected with the CPE sub-system.

Step 403: the CPE sub-system judges whether the wireless connection of the WAN connected with an MID sub-system has been disabled; if so, execute Step 407; otherwise, execute Step 404. The basis for the CPE sub-system judging whether the wireless connection of the WAN connected with the MID sub-system has been disabled is: a parameter stored in a memory when a user sets whether to disable the wireless access of the WAN connected with the MID sub-system.

Step 404: the MID sub-system carries out the wireless connection to the WAN; if the connection succeeds, execute Step 406; otherwise, execute Step 402.

Specifically, the CPE sub-system sends the connection request for carrying out a data connection with the WAN to the MID sub-system through a connection interface, to notify the MID sub-system to start carrying out the wireless connection to the WAN connected with the MID sub-system. The MID sub-system carries out the wireless connection to the WAN connected with the MID sub-system in a mode of PPP; if the connection succeeds, execute Step 406; otherwise, execute Step 402.

Step 405: the CPE sub-system carries out the wired connection to the WAN; if the connection succeeds, execute Step 406; otherwise, execute Step 403.

Specifically, the CPE sub-system carries out the wired connection to the WAN connected with the CPE sub-system in a mode of PPPoE; if the connection succeeds, execute Step 406; otherwise, execute Step 403, so that a wireless connection can be carried out with the WAN through the MID sub-system when the CPE sub-system fails to carry out the wired connection to the WAN connected with the CPE sub-system itself in a mode of PPPoE.

Step 406: enjoy network services; end the current access process.

Specifically, after the CPE sub-system carries out the wired connection to the WAN connected with the CPE sub-system successfully, or the MID sub-system carries out the wireless connection to the WAN connected with the MID sub-system successfully, the device, connected with the CPE sub-system, requesting access to a network starts enjoying network services.

Step 407: display prompt information which prompts that the WAN is not able to be accessed.

Specifically, devices such an indicating light can be adopted to prompt to a user that both the CPE sub-system and MID sub-system are not able to access the WAN and therefore the network connection can not be realized.

Figure 5:
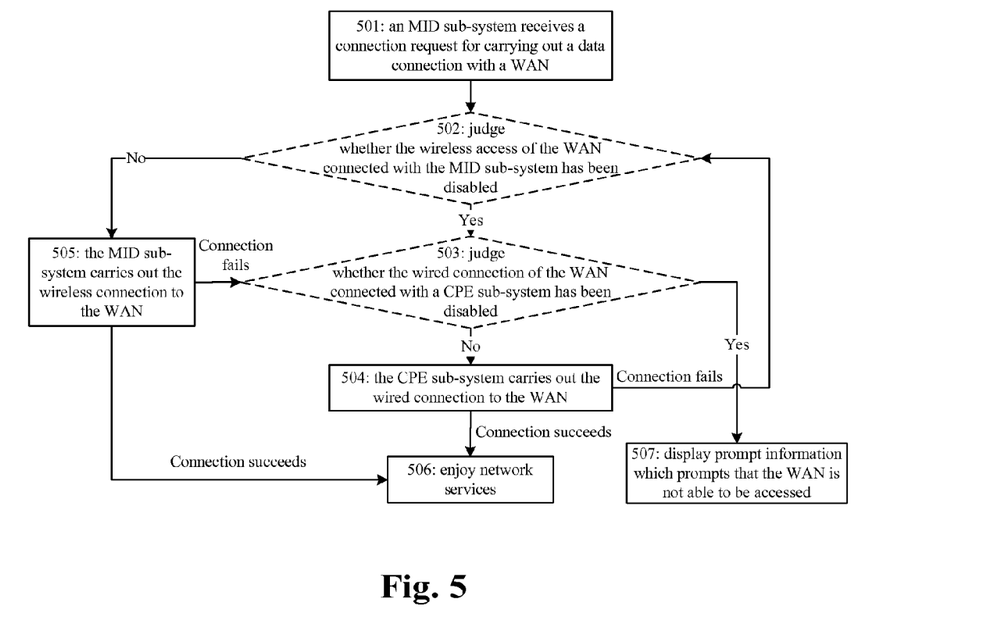
FIG. 5 shows a flowchart of a method for an MID sub-system accessing a WAN in accordance with an embodiment of the present invention.

FIG. 5 shows a flowchart of a method for an MID sub-system accessing a WAN in accordance with an embodiment of the present invention. As shown in FIG. 5, the method for the MID sub-system accessing the WAN in accordance with the embodiment of the present invention comprises the steps as follows.

Step 501: the MID sub-system receives a connection request for carrying out a data connection with the WAN.

Specifically, the MID sub-system receives a connection request for carrying out a data connection with the WAN from a device, connected with the MID sub-system, requesting access to a network. The device, connected with the MID sub-system, requesting access to a network is, for example, a mobile terminal with a Bluetooth connection function.

Step 502: it is judged whether the wireless access of the WAN connected with the MID sub-system has been disabled; if so, execute Step 503; otherwise, execute Step 505.

Specifically, the MID sub-system judges whether the wireless access of the WAN connected with the MID sub-system itself has been disabled; if so, execute Step 503; otherwise, execute Step 505, wherein the basis for the MID sub-system judging whether the wireless connection of the WAN connected with the MID sub-system itself has been disabled is: a parameter stored in a memory when a user sets whether to disable the wireless access of the WAN connected with the MID sub-system.

Step 503: the MID sub-system judges whether the wired connection of the WAN connected with a CPE sub-system has been disabled; if so, execute Step 507; otherwise, execute Step 504. The basis for the MID sub-system judging whether the wired connection of the WAN connected with the CPE sub-system has been disabled is: a parameter stored in a memory when a user sets whether to disable the wired connection of the WAN connected with the CPE sub-system.

Step 504: the CPE sub-system carries out the wired connection to the WAN; if the connection succeeds, execute Step 506; otherwise, execute Step 502.

Specifically, the MID sub-system sends the connection request for carrying out a data connection with the WAN to the CPE sub-system through a connection interface, to notify the CPE sub-system to start carrying out the wired connection to the WAN connected with CPE sub-system. The CPE sub-system carries out the wired connection to the WAN connected with the CPE sub-system in a mode of PPPoE; if the connection succeeds, execute Step 506; otherwise, execute Step 502.

Step 505: the MID sub-system carries out the wireless connection to the WAN; if the connection succeeds, execute Step 506; otherwise, execute Step 503.

Specifically, the MID sub-system carries out the wireless connection to the WAN connected with the MID sub-system in a mode of PPP; if the connection succeeds, execute Step 506; otherwise, execute Step 503, so that a wired connection can be carried out with the WAN through the CPE sub-system when the MID sub-system fails to carry out the wireless connection to the WAN connected with the MID sub-system itself in a mode of PPP.

Step 506: enjoy network services; end the current access process.

Specifically, after the MID sub-system carries out the wireless connection to the WAN connected with the MID sub-system successfully, or the CPE sub-system carries out the wired connection to the WAN connected with the CPE sub-system successfully, the device, connected with the MID sub-system, requesting access to a network starts enjoying network services.

Step 507: display prompt information which prompts that the WAN is not able to be accessed.

Specifically, devices such a display can be adopted to prompt to a user that both the CPE sub-system and MID sub-system are not able to access the WAN and therefore the network connection can not be realized.

The above are only the preferable embodiments of the present invention and are not intended to limit the scope of protection of the present invention. Any modification, equivalent substitute and improvement made within the principle of the present invention are deemed to be included within the scope of protection of the present invention.

What is claimed is:

1. An access system, comprising: a Customer Premise Equipment (CPE) sub-system, a Mobile Internet Device (MID) sub-system and a connection interface, wherein
    the connection interface is configured to provide a channel for communication between the CPE sub-system and the MID sub-system;
    the CPE sub-system is configured to receive a connection request for carrying out a data connection with a WAN and carry out a wired connection with the WAN, and the CPE sub-system is further configured to send, when determining that the CPE sub-system itself is not able to carry out a wired connection with the WAN, the connection request to the MID sub-system through the connection interface so that a wireless connection is carried out with the WAN through the MID sub-system; and
    the MID sub-system is configured to receive a connection request for carrying out a data connection with the WAN and carry out a wireless connection with the WAN, and the MID sub-system is further configured to send, when determining that the MID sub-system itself is not able to carry out a wireless connection with the WAN, the connection request to the CPE sub-system through the connection interface so that a wired connection is carried out with the WAN through the CPE sub-system.

2. The system according to claim 1, further comprising:
    a charge interface, configured to implement a charge function for a battery in the MID sub-system by the CPE sub-system.

3. An access method, comprising:
    a CPE sub-system receiving a connection request for carrying out a data connection with a WAN and carrying out a wired connection with the WAN through the CPE sub-system when the CPE sub-system is able to carry out the wired connection with the WAN, and sending, when determining that the CPE sub-system itself is not able to carry out a wired connection with the WAN, the connection request to an MID sub-system through a connection interface so that a wireless connection is carried out with the WAN through the MID sub-system;
    the MID sub-system receiving a connection request for carrying out a data connection with the WAN and carrying out a wireless connection with the WAN through the MID sub-system when the MID sub-system is able to carry out the wireless connection with the WAN, and sending, when determining that the MID sub-system itself is not able to carry out a wireless connection with the WAN, the connection request to the CPE sub-system through the connection interface so that a wired connection is carried out with the WAN through the CPE sub-system.

4. The method according to claim 3, wherein
    the step of the CPE sub-system carrying out the wired connection with the WAN comprises: the CPE sub-system carrying out the wired connection with the WAN connected with the CPE sub-system, through a Point to Point Protocol Over Ethernet (PPPoE) mode;
    the step of the MID sub-system carrying out the wireless connection with the WAN comprises: the MID sub-system carrying out the wireless connection with the WAN connected with the MID sub-system, through a Point to Point Protocol (PPP) mode.

5. The method according to claim 3, further comprising: when the CPE sub-system is not able to carry out the wired connection with the WAN and the MID sub-system is not able to carry out the wireless connection with the WAN, prompting that the WAN is not able to be accessed.

6. The method according to claim 4, further comprising: when the CPE sub-system is not able to carry out the wired connection with the WAN and the MID sub-system is not able to carry out the wireless connection with the WAN, prompting that the WAN is not able to be accessed.

7. A CPE device, comprising:
    a PPPoE access module, configured to carry out a wired broadband access to a WAN in a wired connection mode through a WAN port by a CPE sub-system;
    a WAN access mode selection module, configured to receive a connection request for carrying out a data connection with the WAN, and send, when determining that the CPE sub-system is not able to carry out a wired connection with the WAN, the connection request to a Wireless Fidelity Access Point (WiFi AP) module through a Wireless Fidelity (WiFi) interface;
    the WiFi AP module, configured to provide wireless coverage carried out in a WiFi mode to enable an MID sub-system having a Wireless Fidelity Client (WiFi Client) module to access the CPE sub-system, and send the connection request to the MID sub-system through the WiFi interface so that a wireless connection is carried out with the WAN through the MID sub-system.

8. The device according to claim 7, wherein,
    the WiFi AP module is further configured to trigger the PPPoE access module after receiving, from the MID sub-system, a connection request for carrying out a data connection with the WAN.

9. An MID device, comprising:
    a PPP access module, configured to carry out a wireless access to a WAN through a wireless data card by an MID sub-system;
    a WAN access mode selection module, configured to receive a connection request for carrying out a data connection with the WAN, and send, when determining that the MID sub-system is not able to carry out the wireless connection with the WAN, the connection request to a WiFi Client module through a WiFi interface; and
    the WiFi Client module, configured to realize a wireless communication with a WiFi AP module in a CPE sub-system by taking the MID sub-system as a WiFi client, and send the connection request to the CPE sub-system through the WiFi interface so that a wired connection is carried out with the WAN through the CPE sub-system.

10. The device according to claim 9, wherein
    the WiFi Client module is further configured to trigger the PPP access module after receiving, from the CPE sub-system, a connection request for carrying out a data connection with the WAN.

* * * * *